United States Patent
Huber et al.

(10) Patent No.: US 6,912,846 B2
(45) Date of Patent: Jul. 5, 2005

(54) METHOD AND APPARATUS FOR METERING A REDUCING AGENT FOR REMOVING NITROGEN OXIDES FROM EXHAUST GASES

(75) Inventors: Sven Huber, Freilassing (DE); Hanspeter Mayer, Markt Piesting (AT); Gerhard Mueller, Freilassing (DE); Michael Offenhuber, Adnet (AT)

(73) Assignee: Robert Bosch GmbH, Stuttgart (DE)

( * ) Notice: Subject to any disclaimer, the term of this patent is extended or adjusted under 35 U.S.C. 154(b) by 85 days.

(21) Appl. No.: 10/130,361

(22) PCT Filed: Sep. 20, 2001

(86) PCT No.: PCT/DE01/03621

§ 371 (c)(1),
(2), (4) Date: Dec. 9, 2002

(87) PCT Pub. No.: WO02/24311

PCT Pub. Date: Mar. 28, 2002

(65) Prior Publication Data

US 2004/0060286 A1 Apr. 1, 2004

(30) Foreign Application Priority Data

Sep. 22, 2000 (DE) .......................................... 100 47 516

(51) Int. Cl.⁷ ................................................ F01N 3/00
(52) U.S. Cl. ............................ 60/286; 60/295; 60/303; 137/487.5; 239/124; 239/126; 123/461; 123/561
(58) Field of Search ......................... 60/274, 286, 295, 60/301, 303; 137/487.5; 239/124, 126, 127; 123/457, 458, 459, 461, 516

(56) References Cited

U.S. PATENT DOCUMENTS

| | | | | |
|---|---|---|---|---|
| 5,606,856 A | * | 3/1997 | Linder et al. .................. | 60/286 |
| 5,615,656 A | * | 4/1997 | Mathis ........................ | 123/447 |
| 5,771,689 A | * | 6/1998 | Bareis et al. .................. | 60/286 |
| 5,809,774 A | * | 9/1998 | Peter-Hoblyn et al. ....... | 60/274 |
| 6,058,912 A | * | 5/2000 | Rembold et al. ........... | 123/516 |
| 6,192,677 B1 | * | 2/2001 | Tost ............................ | 60/286 |
| 6,209,315 B1 | * | 4/2001 | Weigl ......................... | 60/274 |
| 6,539,708 B1 | * | 4/2003 | Hofmann et al. ............ | 60/286 |
| 6,637,196 B1 | * | 10/2003 | Tost ............................ | 60/286 |

FOREIGN PATENT DOCUMENTS

| | | |
|---|---|---|
| DE | 199 46 902 A1 | 4/2001 |
| DE | 199 47 197 A1 | 4/2001 |
| DE | 199 47 198 A1 | 4/2001 |
| EP | 0 849 443 A1 | 6/1998 |
| WO | WO 00/79108 A1 | 12/2000 |
| WO | WO 01/25600 A1 | 4/2001 |
| WO | WO 01/25601 A1 | 4/2001 |

\* cited by examiner

*Primary Examiner*—Binh Q. Tran
(74) *Attorney, Agent, or Firm*—Ronald E. Greigg

(57) ABSTRACT

A method and an apparatus for metering a reducing agent in which the reducing agent is delivered, via a line and a final control element that regulates the metering, in particular a metering valve, to a catalytic converter assembly for removing nitrogen oxides from the exhaust gases, in particular of a Diesel engine; a pressure drop in the line dictated especially by gas inclusions is detected, and the line is ventilated via the final control element.

13 Claims, 1 Drawing Sheet

METHOD AND APPARATUS FOR METERING A REDUCING AGENT FOR REMOVING NITROGEN OXIDES FROM EXHAUST GASES

CROSS-REFERENCE TO RELATED APPLICATIONS

This application is a 35 USC application of PCT/DE 01/03621 filed on Sep. 20, 2001.

BACKGROUND OF THE INVENTION

1. Field of the Invention

The invention is based on a method and an apparatus for metering a reducing agent, in particular a urea or a urea-water solution, within the context of catalytic exhaust gas posttreatment.

2. Description of the Prior Art

To attain a reduction of $NO_x$ components in exhaust gases, reduction catalytic converters have been developed especially for Diesel engines; they are typically classified as either so-called SCR catalytic converters (for "Selective Catalytic Reduction") and storage catalytic converters. The so-called SCR catalytic converters are regenerated by the delivery of a urea and/or ammonia reducing agent, while the so-called storage catalytic converters are regenerated with hydrocarbons from the entrained internal combustion engine fuel, in so-called rich exhaust gas phases.

From German Patent Application, serial number 19946 900.8, an apparatus is known which for removing nitrogen oxides from exhaust gases, for instance from a Diesel engine, adds urea as a reducing agent in metered fashion. The metering is done via a valve that releases urea doses that are determined via the electrical triggering of the metering valve, its throttling cross section, and the pressure difference prevailing at the throttle valve. The metering apparatus has a return line for returning excess reducing agent as well as a ventilation line for eliminating gas bubbles made up of air or evaporated reducing agent.

SUMMARY OF THE INVENTION

The method of the invention and the metering apparatus of the invention have the advantage over the prior art of furnishing simple ventilation and a compact design, with a reduced number of components, of a metering apparatus. A separate ventilation valve is no longer necessary, and the additional lines for such a valve are also dispensed with, making the line course simpler, and correspondingly the volume of fluid that must be heated in the metering device if correct operation is to be achieved is less, which in turn saves both energy and expense. Furthermore, the metering accuracy is improved, since pressure drops in the supply line, for instance from air inclusions or inclusions of evaporated urea-water solution, can be compensated for by adapted metering. Omitting a separate ventilation valve not only saves component costs and time in assembly, but also the entire metering apparatus can be disposed on a smaller housing block.

It is especially advantageous to provide an electrically triggerable metering pump, for instance with a stepping motor, as a feed means; this assures need-specific pumping, and by means of only a short bypass that connects the outlet of the metering pump to the suction inlet, a return of excess pumped quantities of fluid can already be assured, so that a separate return line to the urea tank can be omitted. This further simplifies the line course and correspondingly reduces the volumes of fluids that have to be heated for correct operation in the metering apparatus. The omission of a separate return line to the urea tank not only saves component costs and time in assembly, but also the entire metering apparatus can be disposed on a smaller housing block and is simpler to mount in the vehicle, since now only a single connection to the urea tank, that is, the supply line, has to be produced.

BRIEF DESCRIPTION OF THE DRAWING

Exemplary embodiments of the invention are explained in further detail in the ensuing description, taken with the drawing, in which.

DESCRIPTION OF THE PREFERRED EMBODIMENTS

Figure 1:
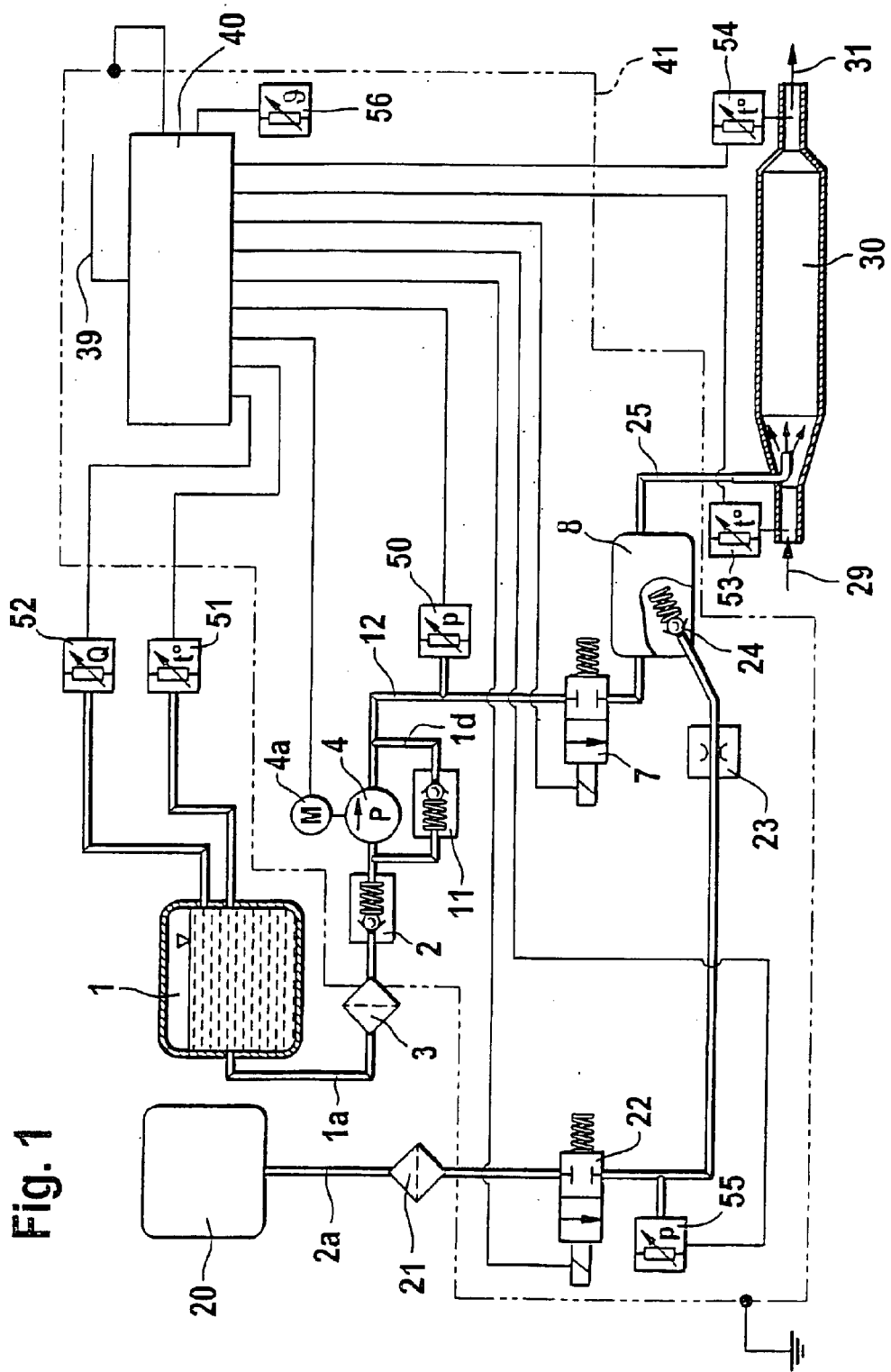
FIG. 1 shows a metering apparatus put together from a water tank, urea tank, and catalytic converter assembly.

In FIG. 1, reference numeral 1 indicates a urea tank, from which a urea-water solution is carried via a urea line 1a to a filter 3 embodied as a filter screen. The filter 3 communicates via a line 12 with a check valve 2, through which the urea-water solution is aspirated by a feed pump 4, embodied for instance as a diaphragm pump, and pumped to a metering valve 7 of a mixing chamber 8. The pump 4 is rpm-controlled via a control motor 4a, in order to minimize the overflow quantity. An excess quantity pumped is returned to the intake side of the pump via a pressure limiting valve 11. Compressed air can be introduced from a compressed air tank 20 into the mixing chamber via a compressed air line 2a, which has a filter screen 21, a 2/2-way valve 22, a throttle 23, and a check valve 24. An aerosol line 25 leads from the mixing chamber 10 to the catalytic converter 30, which has an exhaust gas inlet 29 on one side and an exhaust gas outlet 31 on the opposite side. The urea tank 1 is provided with a fill level sensor 52 and a temperature sensor 51. Between the metering pump 4 and the metering valve 7, a pressure sensor 50 is disposed in the line 12. Temperature sensors 53 and 54 measure the temperature of the exhaust gas at the inlet and outlet, respectively, of the catalytic converter 30. A pressure sensor 55 is also disposed between the 2/2-way valve 22 and the throttle 23. A temperature sensor 56 measures the temperature of a metal housing block 41, on which or with which the components outlined by the dashed line carrying this reference numeral are disposed or integrated. A control unit 40 is also mounted on the housing block 41 and is connected electrically to the sensors 50–56, the control motor 4a and the metering valve 7. The housing block 41 is grounded, and the control unit 40 draws the electrical potential of the housing block 41 as its reference potential. Via a CAN data line 39 (CAN stands for "Controlled Area Network"), the control unit 40 is connected to the voltage supply and other electronic components in the motor vehicle, in particular the engine control unit.

The metering valve 7 meters the requisite urea-water solution into the mixing chamber 8. In the mixing chamber, by subjecting the urea-water solution to the compressed air, an aerosol and a wall film are created, which are introduced into the catalytic converter 30 via the aerosol line 25. To that end, the control unit 40 detects signals on engine operating data, which are received from a higher-order engine control unit via the CAN data line 39, and also detects the signals of the pressure, temperature and fill level sensors 51–56, which are known per se and will not be explained further here. The control unit 40 furthermore receives an electrical signal from the pressure sensor 50, from which the course of the pressure over time in the line 12 between the metering pump 4 and the metering valve 7 is obtained. From the sensor information, the control unit 40 calculates a urea metering quantity, which is to be added to the exhaust gas flowing through the catalytic converter 30. After evaluation of the information, taking the actual pressure values obtained from the sensor 50 into account, the control unit 40 controls the urea-water solution pressure and the pressure in the compressed air line, with the aid of the metering valve 7 and the valve 22. The pressure limiting valve 11 acting as an overflow valve returns any excess quantity of reducing agent pumped through the pump 4 to the intake side of the pump. In an rpm-controlled feed pump or metering pump, the overflow quantities are as a rule small, since these pumps can pump fluids relatively well on demand, so that only small tolerances have to be compensated for, optionally by means of the bypass formed by the overflow valve. If the pressure in the system drops, for instance because of air inclusions, then the control unit opens the metering valve 7, so that ventilation can be done via this valve. If this ventilation operation takes place during catalytic converter operation, then an overly small quantity of fluid will be metered because of the overly low system pressure. The missing quantity can be made up for by suitable triggering of the metering valve, via corrective data stored in memory in the control unit. Accordingly, if a pressure drop is recorded via the pressure sensor 50, the control unit can call up a data performance graph stored in memory in it, which for instance assigns a suitably lengthened opening time of the metering valve, for assuring the injection of a correct quantity of reducing agent, to each value of a pressure difference between the actual pressure value and the set-point pressure value.

Alternatively, the metering apparatus can also be used without compressed air reinforcement, or in other words without using the components 20–24. The pressure sensor 50 can also be replaced by a mass flow sensor. The data performance graph stored in a memory of the control unit must in that case naturally be adapted to the altered input variable (that is, the mass of a defined volume rather than its pressure), so that if this alternative sensor is used it can still perform injection corrections in the event of pressure drops. The mass measured in a mass sensor correlates in every case with the pressure prevailing in the line, so that gas inclusions and thus pressure drops can also be detected by means of a mass sensor. The pressure limiting valve 11 can also be installed in such a way that its inlet, oriented toward the outlet of the pump 4, is disposed directly at the line 12; as a result, the line segment shown in FIG. 1 between the pressure limiting valve 11 and the line 12 can be omitted.

The foregoing relates to preferred exemplary embodiments of the invention, it being understood that other variants and embodiments thereof are possible within the spirit and scope of the invention, the latter being defined by the appended claims.

We claim:

1. A method for metering a reducing agent in which the reducing agent is delivered via a line (12) and a metering valve (7) that regulates the metering to a catalytic converter assembly (30) for removing nitrogen oxides from the exhaust gases from an internal combustion engine, the method including detecting a pressure drop produced in the line (12) and ventilating the line (12) by opening the metering valve (7), wherein the metering valve (7) is opened for ventilating the line (12) as a function of the magnitude of the pressure drop in the line.

2. The method of claim 1, wherein the reducing agent is pumped through the line (12) to the metering valve (7) via an electrically triggerable metering pump (4).

3. The method of claim 2, wherein excess pumped quantities of reducing agent are returned from the outlet of the pump (4) directly to the inlet of the pump (4).

4. The method of claim 1, wherein from the metered reducing agent, an aerosol is formed, and then the aerosol is introduced into the catalytic converter assembly (30).

5. The method of claim 2, wherein from the metered reducing agent, an aerosol is formed, and then the aerosol is introduced into the catalytic converter assembly (30).

6. The method of claim 3, wherein from the metered reducing agent, an aerosol is formed, and then the aerosol is introduced into the catalytic converter assembly (30).

7. The method of claim 4, wherein for forming the aerosol, air is supplied in metered fashion to the reducing agent.

8. An apparatus for metering a urea or urea-water solution reducing agent into an exhaust gas stream, the apparatus comprising means (2, 3, 4) for delivering reducing agent to a catalytic converter assembly (30) for removing nitrogen oxides from the exhaust gases from an internal combustion engine, the means being connected via a line (12) to a metering valve (7) that regulates the metering, a measuring element (50) for measuring the pressure in the line (12), or for measuring a measurement variable correlating with the pressure, and a control means (40) for ventilating the line (12) by opening the metering valve (7), if a pressure drop in the line (12) is detected by the measuring element (50), wherein the control means (40) include a memory for storing a performance graph, so that the metering valve (7) can be opened for ventilation as a function of the magnitude of the pressure drop in the line.

9. The apparatus of claim 8, wherein the means (2, 3, 4) for delivering reducing agent include an electrically triggerable (4a) feed or metering pump (4).

10. The apparatus of claim 9, wherein a return line (1d) with a pressure limiting valve (12) connects the outlet of the metering pump (4) to its inlet.

11. The apparatus of claim 8, wherein the metered delivery of reducing agent is effected into a mixing chamber (8) for forming an aerosol, so that via an aerosol line (25), the aerosol can be introduced into the catalytic converter assembly (30).

12. The apparatus of claim 9, wherein the metered delivery of reducing agent is effected into a mixing chamber (8) for forming an aerosol, so that via an aerosol line (25), the aerosol can be introduced into the catalytic converter assembly (30).

13. The apparatus of claim 11, wherein means (20, 21, 22, 23, 24, 55) are provided for metered delivery of air into the mixing chamber (8).

* * * * *